United States Patent [19]

Nilsson

[11] 3,731,553

[45] May 8, 1973

[54] BALL NUT ASSEMBLY

[75] Inventor: Sven Walter Nilsson, Partille, Sweden

[73] Assignee: SKF Industrial Trading and Development Company N.V., Overtoom, Amsterdam, Netherlands

[22] Filed: Mar. 1, 1971

[21] Appl. No.: 119,658

[52] U.S. Cl.............................74/459, 74/424.8 A
[51] Int. Cl..........................F16h 55/22, F16h 1/18
[58] Field of Search........................74/459, 424.8 R, 74/424.8 A, 89.15

[56] References Cited

UNITED STATES PATENTS

| 2,724,284 | 11/1955 | Anderson et al. | 74/459 |
| 3,404,582 | 10/1968 | Sodergard et al. | 74/424.8 R |

FOREIGN PATENTS OR APPLICATIONS

| 1,374,242 | 8/1964 | France | 74/459 |
| 1,245,960 | 10/1960 | France | 74/459 |

Primary Examiner—Leonard H. Gerin
Attorney—Howson & Howson

[57] ABSTRACT

In order to make possible a simplified manufacture of a ball nut assembly with special consideration to a desire to reduce the number of types necessary for inclusion in machineries of various kinds, the nut is produced in three main parts, viz: a nut body provided with ball recirculating means and two end pieces. The latter can easily be designed in various ways to suit the intended use, but the complicated component, I.e. the nut body can remain the same and thus be manufactured as a standardized unit.

The components are secured together by means of stay bolts in such a manner that a turning of the nut body in relation to the end pieces is prevented.

11 Claims, 11 Drawing Figures

INVENTOR:
SVEN WALTER NILSSON
BY Howson & Howson
ATTYS.

BALL NUT ASSEMBLY

BACKGROUND OF THE INVENTION

The present invention refers to a ball nut mechanism, which is designed with special consideration to the requirement that the nut part as a standardized unit of manufacture shall be useful in a number of a combinations, which is obtained by the end pieces carrying the nut body beeing formed as components, which will be easily integrated into machines of arbitrary types.

SUMMARY OF THE INVENTION

The invention is charachterized in that the nut part comprises a substantially cylindrical body of sufficient length to provide end portions outside the necessary ball recirculation means located in the body, said end portions having a circular cross section, that at least two axially running grooves are formed in the envelope surface of the nut body, the depth of each groove being bigger than its breadths, and in that two end pieces are attached to the nut body, each end piece being provided with a recess adapted to receive a cylindrical end portion of the nut body, as well as with bores for stay bolts, in number and position mating those of the grooves in the body, a corresponding number of stay bolts fitted into the grooves interconnecting the end pieces, at least one end piece being provided with means for mounting the nut assembly at a selected support.

The ball nut mechanism will in this manner become essentially independent of the design of the machinery into which it shall be fitted, and by means of the grooves and the stay bolts the nut body may be secured against rotation with respect to the end pieces and still obtained a satisfactory mounting within the latter.

DESCRIPTION OF THE PREFERRED EMBODIMENTS

Figure 1:
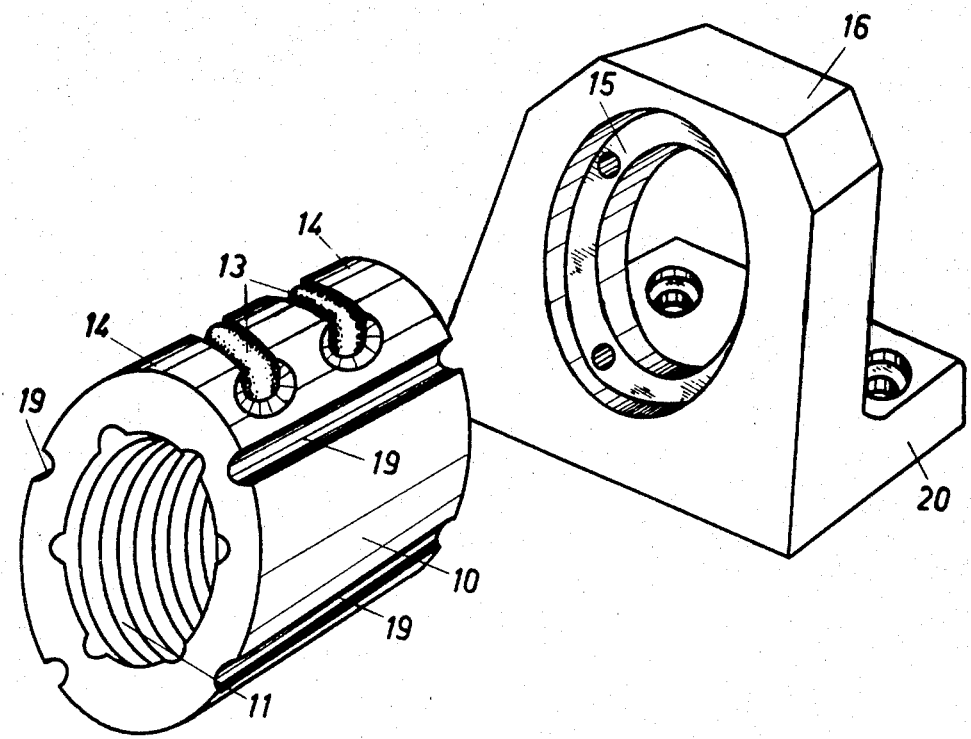
FIG. 1 shows schematically and in perspective an exploded view of a part of the mechanism including the nut body and one end piece.

A ball nut mechanism consists in well known manner of a nut body 10 provided with an internal helical groove 11 of a semi-circular cross section. This nut is designed to cooperate with a threaded shaft 12, which in the same manner is provided with an helical groove having semi-circular cross section. A number of balls is retained within the nut, and will run in the path formed between the nut and the shaft. The nut body is furthermore provided with recirculating means for the balls, which in FIG. 1 schematically is shown as comprising tubular members 13 extending across the ball path, and which are designed to transfer balls from one end of the nut to the other dependent of the direction of movement of the mechanism. The design of the nut body proper and especially the return circulation means for the balls may be choosen from any of the numerous well known designs, and forms no part of the present invention. It should however, be mentioned that dependent upon the intended use the shaft may rotate in relation to the fixed nut, or the latter may be designed to be rotated in relation to the fixed shaft.

Figure 2:
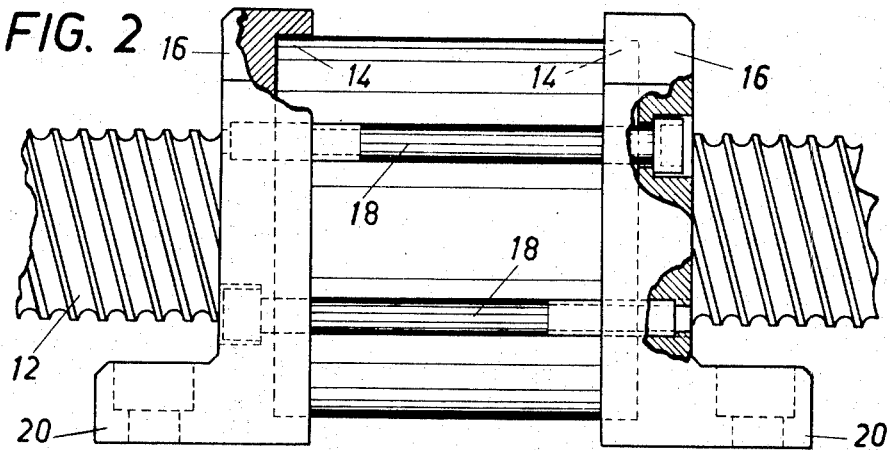
FIG. 2 shows an elevation of a complete ball nut mechanism partly in section and of the type indicated in FIG. 1.
Figure 4:
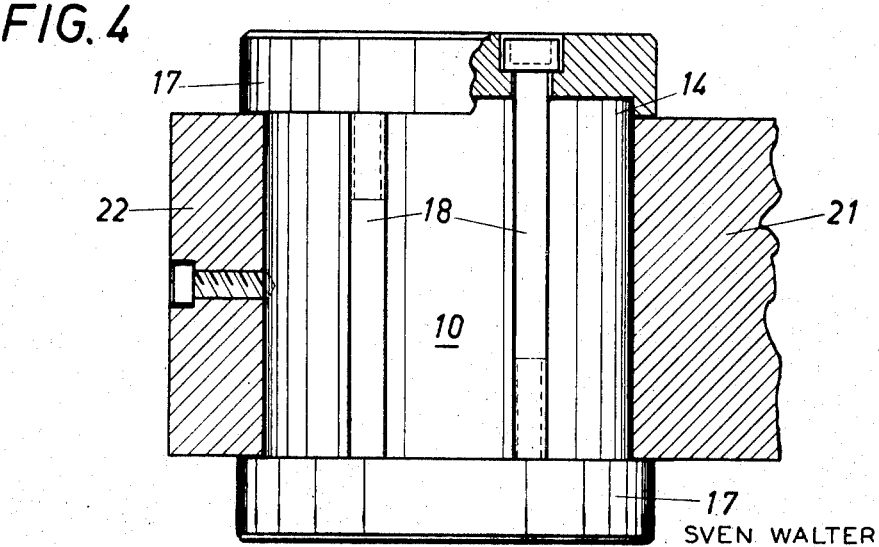
FIG. 4 shows a section through a modified manner of mounting a ball nut mechanism.

The characterizing features of the invention is that the nut body 10 is designed as a substantially cylindrical body, and that the end portions 14 thereof, vide especially FIGS. 2 and 4, have a circular cross section and are intended to be fitted into recesses 15 in end pieces, which in FIG. 2 are denoted by 16 and in FIG. 4 are denoted by 17 and so forth. To maintain the components of the units in proper position a number of stay bolts 18, at least two but preferably four are provided. The envelope surface of the nut body 10 is provided with a corresponding number of axially running grooves 19. The depth of these grooves is bigger than the breadths in such a manner that the stay bolts will be completely sunk below the surfaces of the nut body and thus may fit within the cylindrical recesses 15 of the end pieces.

Figure 3:
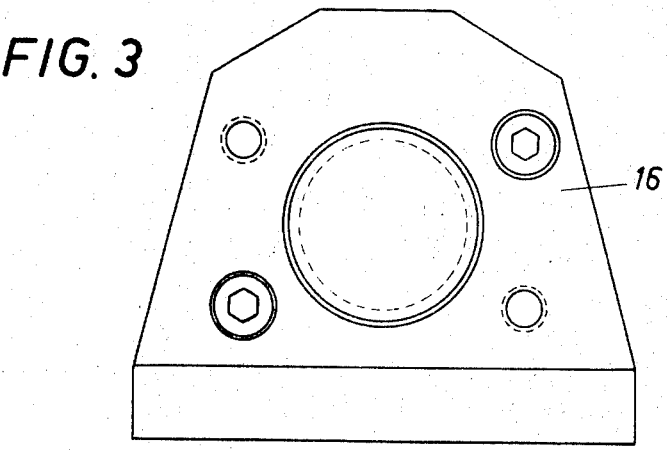
FIG. 3 shows an end view of an end piece according to FIG. 2.

With the embodiment shown in FIGS. 2 and 3 the end pieces 16 are provided with flanges 20, which makes this design suitable to be mounted on a fixed support. The stay bolts 18 are designed to be fitted into the mechanism alternatively from opposite sides thereof, and extend from one end piece through a pertaining groove 19 and are threaded into a corresponding bore in the opposite end piece.

Figure 5:
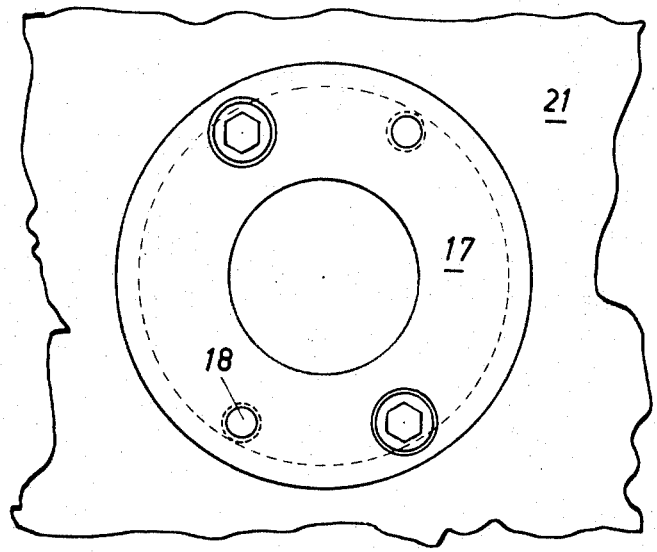
FIG. 5 shows an end view of the ball nut mechanism according to FIG. 4.

With the embodiment shown in FIGS. 4 and 5 the nut body 10 is designed to be mounted within a bore in a machine element and 21 having a thickness corresponding to the distance between the end pieces 17. Also in this case two stay bolts are intended to enter the mechanism from opposite sides thereof through the grooves in the nut body to each side of the ball recirculation means. In the present design the end pieces 17, or the nut body may be secured against rotation in the machine element by means of one or more screws or other locking means.

Figure 6:
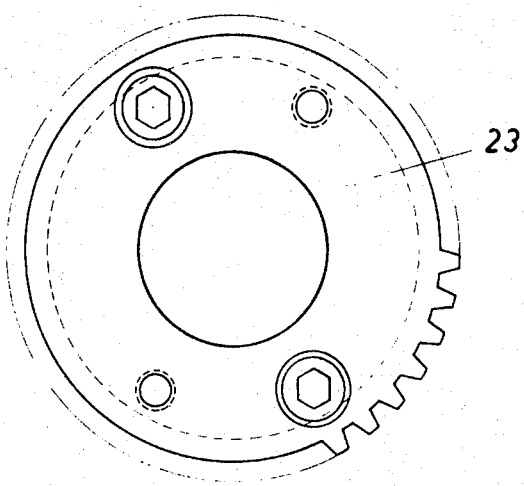
FIG. 6 shows a modified embodiment of the end piece according to FIG. 5.

In the preceeding embodiments it is intended that the nut shall be fixed and the shaft shall rotate. With an embodiment equal to that of FIGS. 4 and 5 the nut may however be rotatable with respect to the machine element. Either or both end piece 23 will then, preferably in the manner shown in FIG. 6, be designed as a pinion which cooperates with a driving mechanism of arbitrary type, not shown here.

Figure 7:
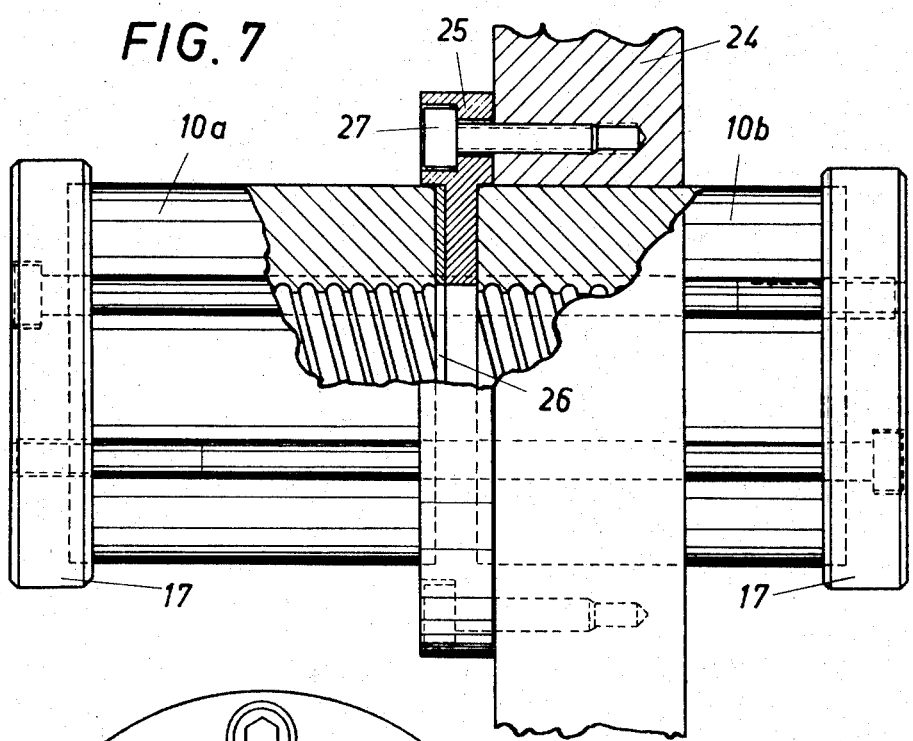
FIG. 7 shows a ball nut mechanism comprising two cooperating nut bodies.
Figure 8:
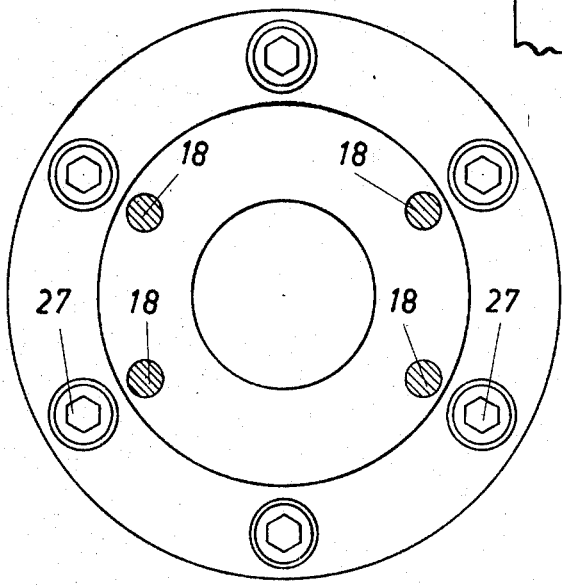
FIG. 8 shows the intermediate piece belonging to the nut bodies of FIG. 7.

With many ball nut mechanisms, especially such which are intended to transmit heavy loads it is desirable to be able to utilize two aligned nut bodies. Such an embodiment is shown in FIGS. 7 and 8. Here two nut bodies 10a and 10b are designed to cooperate with a common shaft. The nut body 10b is mounted in a bore in a machine element 24. Each nut body is provided with an end piece 17 at its outermost end, said end pieces corresponding to those shown in FIG. 4. Between the two nut bodies there is an intermediate end piece 25 common to both nut bodies, and provided with recesses in both side faces. Either or both of these recesses has sufficient depth to permit the insertion of a washer or washers 26 of suitable thickness to make possible an axial adjustment of the relative position of the nut bodies in such a manner that the threads in one nut body will obtain the proper position with respect to those in the second body. The common intermediate end piece 25 is attached to the machine element 24 by means of a suitable number of bolts 27.

Also in this design the nut bodies are retained in proper position by means of stay bolts 18. These may extend continuously between the outer end pieces 17 and in doing so pass through bores in the intermediate end piece 25. It is, however, possible to utilize stay bolts which from the outermost end pieces extend along the adjacent nut body only, and are threaded into bores in the common intermediate end piece 25. The nut bodies are on such occasion preferably turned 90° with respect to each other in such a manner that the fittings for the stay bolts will obtain an even spacing around the perimeter of the intermediate end piece.

Figure 9:
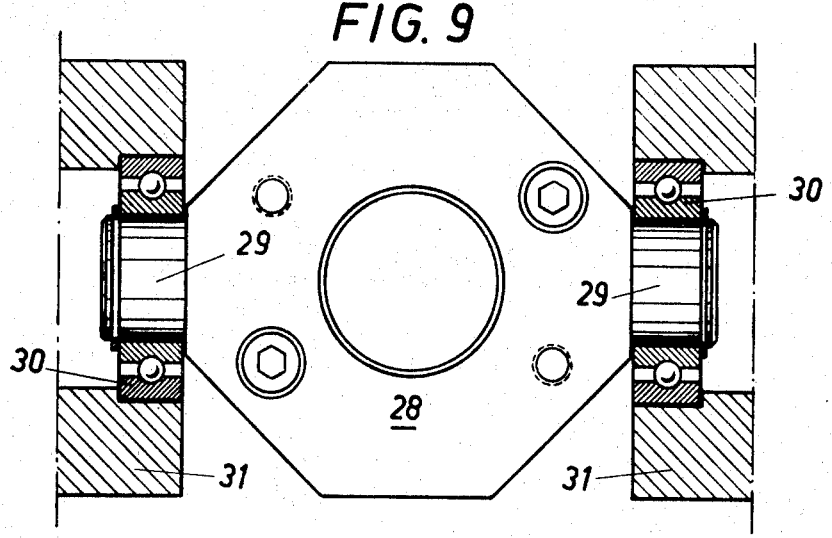
FIG. 9 shows an end piece designed to make possible an angular movement of the ball nut mechanism with respect to the nominal longitudinal axis of the shaft upon which the nut is mounted.
Figure 10:
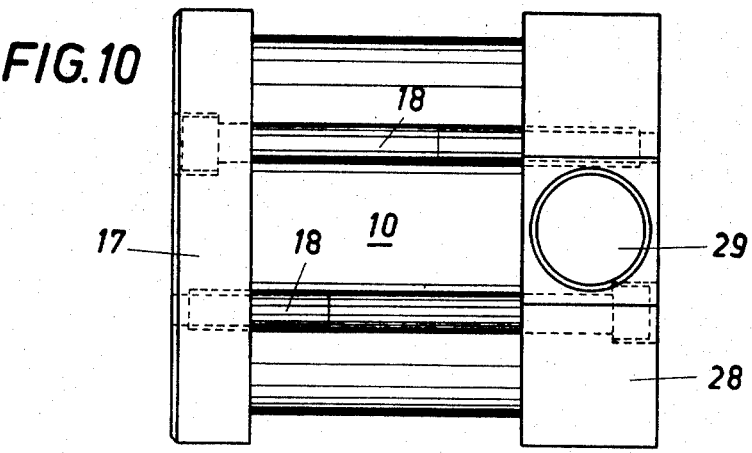
FIG. 10 shows an end view of the mechanism shown in FIG. 9.

On certain occasions it is desirable and suitable to permit a certain angular movement of the mechanism with respect to the nominal longitudinal axis of the shaft. To that end one of the end pieces in the manner shown in FIG. 9 is provided with laterally extending spigots 29 designed to be carried in journal bearings 30 fitted into a machine element 31. FIG. 10 shows an elevation of an essambled nut body of this type. This has principally the same shape as that shown in FIG. 4. The free end piece 17 is similar to that shown in FIG. 4, whereas the other end piece 28, which carries the mechanism is heavier and is provided with the laterally extending spigots 29. The stay bolts 18 will also here alternative emerge in opposite sides from the end pieces.

Figure 11:
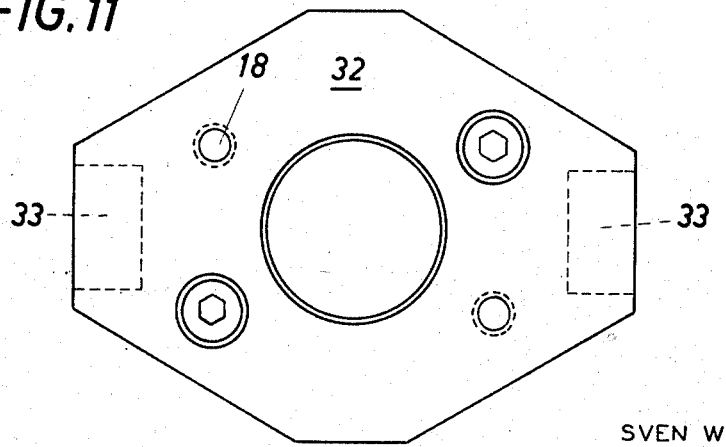
FIG. 11 shows an end piece corresponding to that according to FIG. 9, but modified in some respect and adapted to make possible an angular adjustment of the ball nut mechanism.

FIG. 11 shows a modification of the embodiment according to FIG. 9. Here the end piece 32 is instead provided with two aligned bores 33 extending into the end piece from opposite sides thereof and designed in assembled position to cooperate with spigots in a machine element of arbitrary type.

What I claim is:

1. A ball nut assembly of the type adapted to cooperate with a threaded shaft, where the nut will work thereon through the intermediation of a number of balls, said nut being provided with means for recirculating the balls from one portion of its body to another portion during the relative displacement of the nut and the shaft, the improvement comprising, a cylindrical portion at each end of the nut body, outside the ball recirculating means, at least two axially running grooves in the envelope surface of the nut body, the depth of each groove being greater than its breadth, an end piece for attachment to each end of the nut body, each end piece being provided with a recess adapted to receive one cylindrical end portion of the nut body as well as with bores for stay bolts in number and position matching the grooves in the nut body, said end pieces adapted to be attached to said nut body on opposite sides of a support where the nut body has been fitted into a bore in such a manner that its end portions will extend outside the bore, means for preventing rotation of the nut body in relation to the machine element.

2. The ball nut assembly according to claim 1 in which each end piece is provided with a flange suited for attachment to a support.

3. The ball nut assembly according to claim 1, where two nut bodies are fitted in aligned position characterized in that an intermediate end piece common to both nut bodies, is provided with recesses of sufficient depth to permit The application within at least one of the recesses of washers of varying thickness in order to make possible an adjustment in the axial direction of the distance between the two nut bodies.

4. The ball nut assembly according to claim 3, in which the intermediate end piece is provided with through bores for stay bolts extending along both nut bodies.

5. The ball nut assembly according to claim 3 in which the intermediate end piece is provided with threaded bores designed to receive the ends of stay bolts, which from each of the outer end pieces extend along the adjacent nut body to the intermediate end piece.

6. The ball nut assembly according to claim 1 in which one end piece is provided with means for carrying the nut body in such a manner that the latter can perform a limited pendulum movement with respect to the nominal longitudinal axis of the shaft upon which it moves.

7. The ball nut assembly according to claim 1 in which the carrying end piece is provided with laterally extending spigots for mounting in a journal bearing of arbitray type.

8. The ball nut assembly according to claim 1 in which the carrying end piece is provided with two aligned bores entering the end piece from opposite sides thereof and designed for cooperation with spigots of an adjacent.

9. The ball nut assembly according to claim 1 in which the nut body is designed to be rotatably mounted in a machine element and where at least one of the end pieces is formed as a pinion engaging with a mechanism for rotating the nut.

10. The ball nut assembly according to claim 1 in which there are four grooves in the nut body, grouped in pairs on opposite sides of the ball recirculating means.

11. A ball nut assembly of the type adapted to cooperate with a threaded shaft, where the nut will work thereon through the intermediation of a number of balls, said nut being provided with means for recirculating the balls from one portion of its body to another portion during the relative displacement of the nut and the shaft, the improvement comprising a cylindrical portion at each end of the nut body, outside the ball recirculating means, at least two axially running open grooves in the envelope surface of the nut body, the depth of each groove being greater than its breadth, an end piece for attachment to each end of the nut body, each end piece being provided with a recess adapted to receive one cylindrical end portion of the nut body as well as with bores for stay bolts in number and position matching the grooves in the nut body, said recess being of a stepped configuration and including a circumferential end wall confronting the axial end face of the nut body and having therein said bores, a stay bolt fitted into each groove at the nut body and provided with means to engage the end pieces to force them toward the nut body, and means at at least one of the end pieces for mounting the nut assembly at a selected support.

* * * * *